(12) United States Patent
Kamei et al.

(10) Patent No.: US 6,307,981 B1
(45) Date of Patent: Oct. 23, 2001

(54) IMAGE FORMING DEVICE

(75) Inventors: Nobuo Kamei, Toyokawa; Munehiro Nakatani, Toyohashi, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/986,322

(22) Filed: Dec. 5, 1997

(30) Foreign Application Priority Data

Dec. 6, 1996 (JP) .................................................. 8-326568

(51) Int. Cl.⁷ ......................................................... G06K 9/03
(52) U.S. Cl. ........................ 382/309; 382/232; 358/405; 714/735
(58) Field of Search ..................................... 382/309, 221, 382/244, 232, 238; 358/404, 1.16–1, 17, 1.14, 444, 406, 405; 347/19; 714/735, 719, 805, 819, 824

(56) References Cited

U.S. PATENT DOCUMENTS

| | | | | |
|---|---|---|---|---|
| 5,463,700 | * | 10/1995 | Nakazawa | 382/232 |
| 5,510,896 | * | 4/1996 | Wafler | 358/296 |
| 5,526,137 | * | 6/1996 | Nameki | 358/406 |
| 5,537,483 | * | 7/1996 | Stapleton et al. | 382/309 |
| 5,732,157 | * | 3/1998 | Osawa | 382/244 |
| 5,787,199 | * | 7/1998 | Lee | 382/203 |
| 5,796,864 | * | 8/1998 | Callahan | 382/166 |
| 5,835,691 | * | 10/1998 | Matsunoshita | 358/1.17 |
| 5,901,278 | * | 5/1999 | Kurihara et al. | 358/1.15 |

* cited by examiner

Primary Examiner—Leo Boudreau
Assistant Examiner—Ishrat Sherali
(74) Attorney, Agent, or Firm—McDermott, Will & Emery

(57) ABSTRACT

A memory error detecting device for an image forming apparatus having a memory unit, a first generating means, a second generating means, a comparison means, and a memory error warning means. The first generating means generates first information related to first image data input to the memory unit. The second generating means generates second information related to second image data output from the memory unit. The comparison means compares the first information with the second information, and generates a comparison result signal. The memory error warning means signifies an error in the memory unit when the comparison result signal indicates that the first information differs from the second information.

6 Claims, 11 Drawing Sheets

IMAGE FORMING DEVICE

FIELD OF THE INVENTION

The present invention relates to an image forming apparatus for digital copiers and the like.

BACKGROUND OF THE INVENTION

In image forming apparatuses such as digital copiers and the like using electrophotographic methods, analog image data of a document read by a charge-coupled device (CCD) sensor are converted to digital data and subjected to image quality correction processing including modulation transfer function (MTF) correction, halftone correction and the like. Thereafter, the digital data are temporarily stored in a memory unit. Then, the digital data are read out from the memory unit as needed, subjected to editing processes of enlargement, reduction and the like, and subsequently again converted to analog data to generate laser diode (LD) drive signals based on the data so as to produce the emission of a laser beam from a semiconductor laser.

In image forming apparatuses executing complex data processing such as described above, the circuits of the apparatus are necessarily large and many circuit boards are required. Therefore, a disadvantage arises in that if an error condition occurs in such an apparatus, it is difficult to ascertain the point of origin of the problem, i.e. as being due to erroneous data read from the memory unit, or another problem.

It has been suggested, for example, that an apparatus should generate a checksum for each image unit when image data are transmitted or stored in memory, and the checksums should be stored together with the image data. Since a checksum is used to verify that image data are identical to the state when the image data were generated, a checksum is unsuitable for systems such as the aforesaid image forming apparatus of a digital copier inasmuch as the data input to the memory unit differs from the actual data output due to the various types of image processing to which they are subjected. Image processing in this instance includes, for example, variable magnification, rotation, shift, 2-in-1 and the like.

SUMMARY OF THE INVENTION

An object of the present invention is to eliminate the previously described disadvantages.

Another object of the present invention is to provide an image forming apparatus capable of identifying memory errors.

Yet another object of the present invention is to provide an image forming apparatus provided with a function to verify memory unit errors even when the image data input to the memory unit differs from the image data output due to image processing carried out by the apparatus.

The present invention attains these and other objects by providing an image forming apparatus that includes a memory error detecting device. The memory error detecting device includes a memory unit for storing the image data of an image being reproduced, and for storing the edited image data of the image to be transferred onto a reproduction medium. The device determines the number of black pixels within the image data and within the edited image data, and compares the results to determine if a memory error has occurred. If a memory error is detected, then the device halts the reproduction process, and informs the user that an error condition exists., Accordingly, the memory error detecting device of the present invention is capable of detecting memory errors, even where the image data of the image being reproduced is edited and different from the image data of the output image.

BRIEF DESCRIPTION OF THE DRAWINGS

These and other objects and features of the present invention will become apparent from the following description of the preferred embodiments thereof taken in conjunction with the accompanying drawings, in which.

DETAILED DESCRIPTION OF THE PREFERRED EMBODIMENTS

Figure 1:
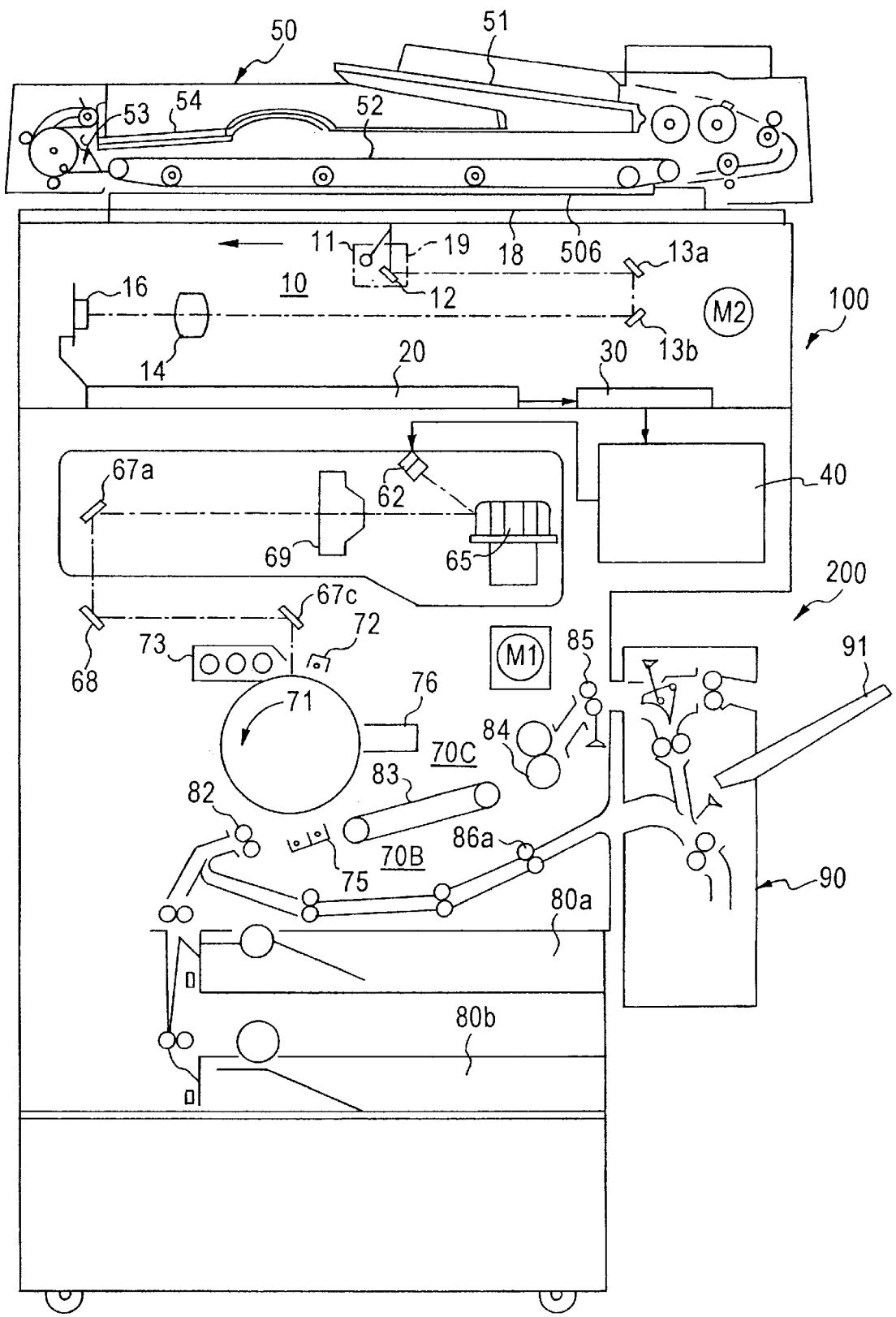
FIG. 1 shows the construction of a digital copier.

The preferred embodiments of the present invention are described hereinafter with reference to the accompanying drawings, wherein like parts are designated with like reference numbers throughout the several drawings. FIG. 1 shows the construction of a digital copier of the electrophotographic type. This copier can be broadly divided into an image reader 100 which reads a document image and converts the image to a digital image, and a printer 200 which forms an image on a sheet based on the image data read by image reader 100.

In image reader 100, an auto document feeder 50 sequentially transports the lowermost document of a stack of documents placed on a document tray 51 to a predetermined position on platen 18. After a document is read, the read document is ejected to a discharge tray 54 by transport belt 52. When both sides of a document are read, a document which has been read on a first'side is inverted by switching a switching member 53 and again transporting the document for placement on platen 18. A document placed on platen 18 is illuminated by a lamp 11 provided on scanner 19. The light reflected from the illuminated document surface forms an image on the surface of a charge-coupled device (CCD) line sensor 16 via mirrors 12, 13*a*, and 13*b*, and image forming lens 14. Scanner 19 moves at a speed V in the arrow direction (subscan direction) in accordance with a set magnification by means of a scanner motor M2. The entire surface of a document placed on platen 18 is scanned by means of the aforesaid movement of scanner 19. Mirrors 13*a* and 13*b* move in the same arrow direction (subscan direction at a speed V/1 in conjunction with the movement of scanner 19. Image signals produced by CCD line sensor 16 are subjected to various image quality correction processes including shading correction, γ correction, modulation transfer function (MTF) correction and the like in image signal processing unit 20, and after compression encoding the data are temporarily stored in memory unit 30. In memory unit 30, the stored code data are expanded according to system requirements, and rotated data are output to printer 200 as print data in accordance with system requirements.

In printer 200, a print processing unit 40 generates laser drive signals based on the print data output from memory unit 30. Semiconductor laser 62 emits a laser beam based on the laser drive signals output from print processing unit 40. A laser beam emitted from semiconductor laser 62 is reflected by a high-speed rotating polygonal mirror 65, and after eliminating distortion caused by f(θ) lens 69, the beam exposes and scans the surface of a photosensitive drum 71 via mirrors 67a, 67b, and 67c, The surface of photosensitive drum 71 is uniformly charged by a charger 72 prior to exposure of each single copy. Therefore, when the uniformly charged surface of photosensitive drum 71 is irradiated by the laser beam, an electrostatic latent image is formed on the surface of the photosensitive drum 71. The electrostatic latent image formed on the surface of photosensitive drum 71 is then developed toner developing device 73.

A copy sheet of suitable size is transported from paper cassette 80a or 80b to a pair of timing rollers 82. The pair of timing rollers 82 transport the copy sheet to a transfer area with a timing which matches the leading edge of the copy sheet and the leading edge of the toner image developed on the surface of photosensitive drum 71. At the transfer area, the toner image developed on the surface of photosensitive drum 71 is transferred to the copy sheet via a transfer charger 75. The copy sheet bearing the transferred toner image is separated from the surface of the photosensitive drum 71 and transported via a transport belt 83 to a fixing device 84, and the toner image is fused to the surface of the copy sheet by passing through the fixing device 84, whereupon the sheet is fed to the recirculation unit 90 via discharge roller 85.

The recirculation unit 90 is provided at the side of printer 200 so as to automate duplex copies, and when copying to the back side of a copy sheet, a sheet fed by discharge roller 85 is inverted front-to-back and subsequently directly to the recirculation transport path 86. Recirculation transport path 86 transports the inserted sheet to the pair of timing rollers 82. After a simplex copy has been completed, or when the back side of a copy has been completed in the case of duplex copies, the copy r sheet is ejected to discharge tray 91 via recirculation unit 90.

Figure 2:
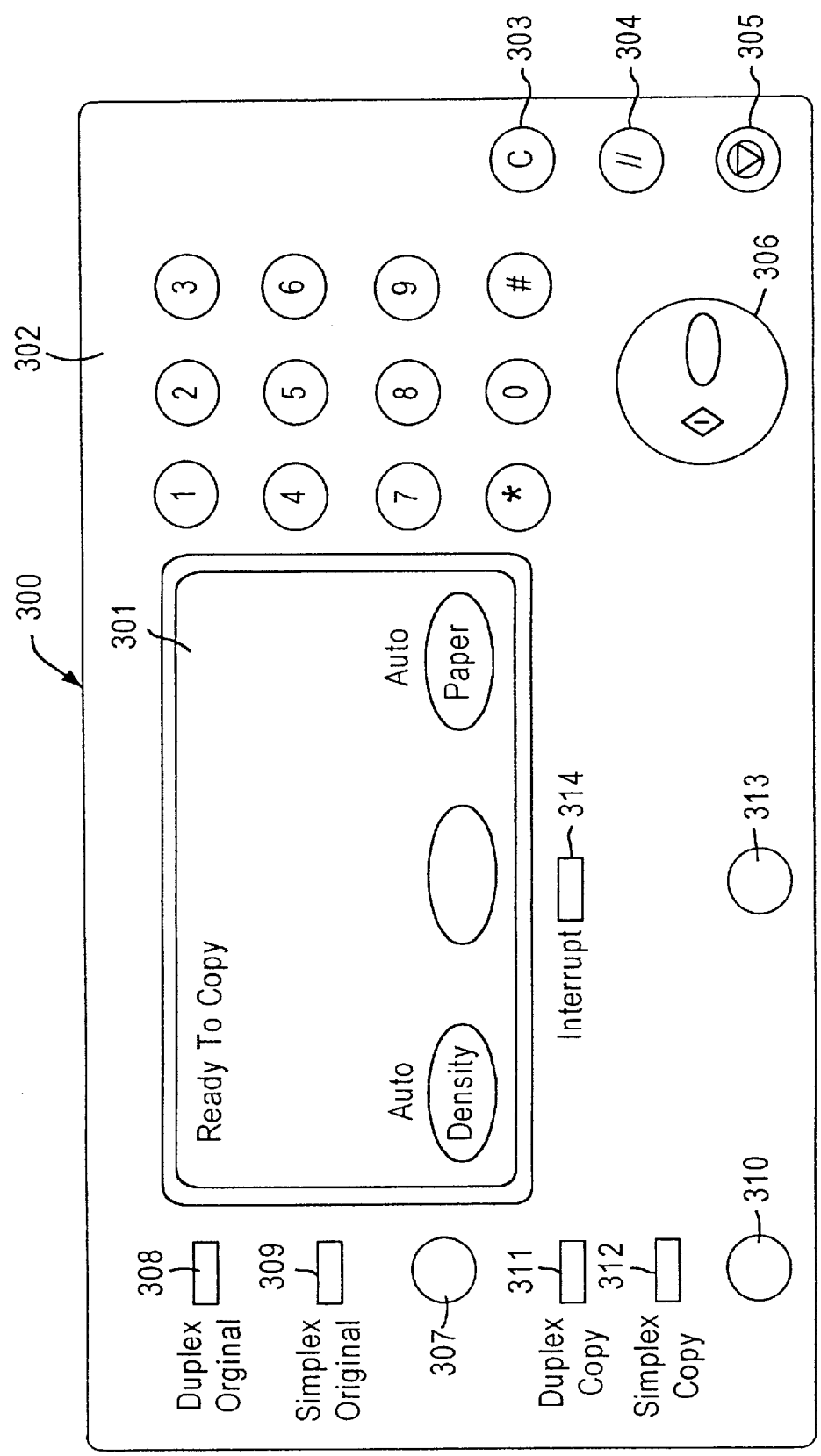
FIG. 2 is a front view of the operation panel.

FIG. 2 illustrates a view of the operation panel 300. Liquid crystal touchpad 301 displays the copier operation mode and the content of the set copy mode, and can be used to specify various types of modes by touching its surface. A ten-key pad 302 is used to directly enter the number of copies, copy magnification and the like. A clear key 303 is used to return the settings to their initial values. A panel reset key 304 initializes the copy mode to a default mode. A stop key 305 interrupts a copy operation. A start key 306 start a copy operation. Key 307 specifies the type of document being used (i.e., duplex/simplex), and alternately sets the duplex document mode or simplex document mode with each depression of the key. When the duplex document mode is set, a light-emitting diode (LED) 308 is turned ON, and when the simplex document mode is set, an LED 309 is turned ON. A Key 310 is used to set the copy mode, and alternately sets the duplex copy mode or simplex copy mode with each depression of the key. When the duplex copy mode is set, LED 311 is turned ON, and when the simplex copy mode is set, the LED 312 is turned ON. A key 313 is an interrupt key to execute an interrupt process, and LED 314 is turned ON when interrupt key 313 is depressed.

Figure 3:
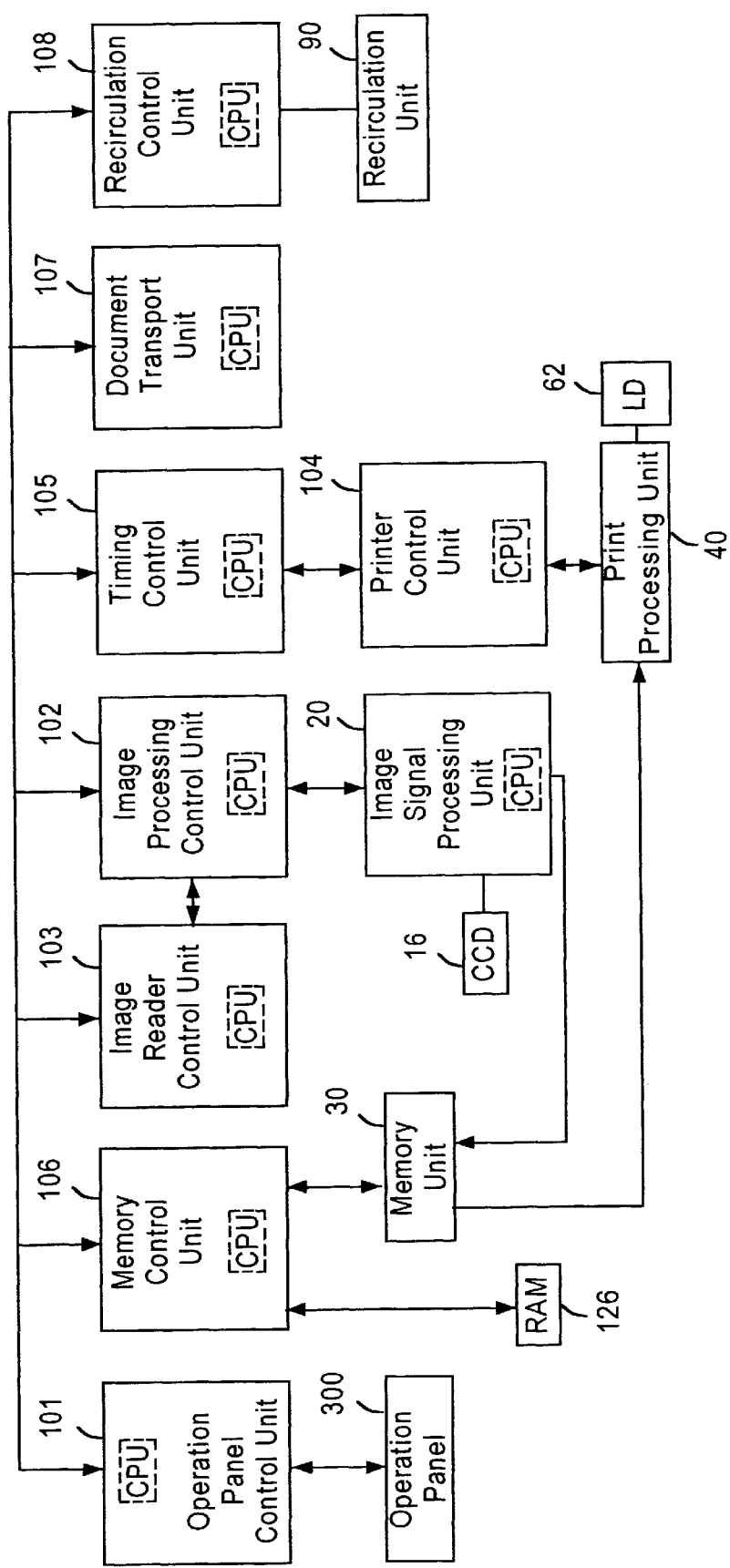
FIG. 3 is a block diagram of the control unit of the copier.

FIG. 3 is a block diagram of the control units of the copier. The control units 101–108 are central processing units (referred to as "CPU" in the drawing), which are provided with a read only memory (ROM) to store needed programs, and random access memory (RAM) to use as work areas, and the CPUs are mutually connected via serial input/output (I/O).

Operation panel control unit 101 receives the key input from operation panel 300 and controls the display and lighting of liquid crystal touch panel 301, and LEDs 308, 309, 311, 312, 313, and 314 in accordance with the key input.

Image processing control unit 102 controls the image processing unit 20.

Image reader control unit 103 controls the actuation of the scanner motor M2 and the like of image reader 100.

Printer control unit 104 receives detection signals from sensors (not illustrated) disposed at various locations in printer 200, and controls the actuation of print processing unit 40 including semiconductor laser 62.

Timing control unit 105 controls general timing adjustment and operation mode settings of various control units connected via the serial I/O.

Memory control unit 106 generates print data by subjecting the image data transmitted from image signal processing unit 20 to various processing via control of memory unit 30, and outputs the print data to print process unit 40 which executes the actual image forming process.

Document transport unit 107 controls the auto document feeder 50.

Recirculation control unit 108 controls the recirculation unit 90.

Figure 4:
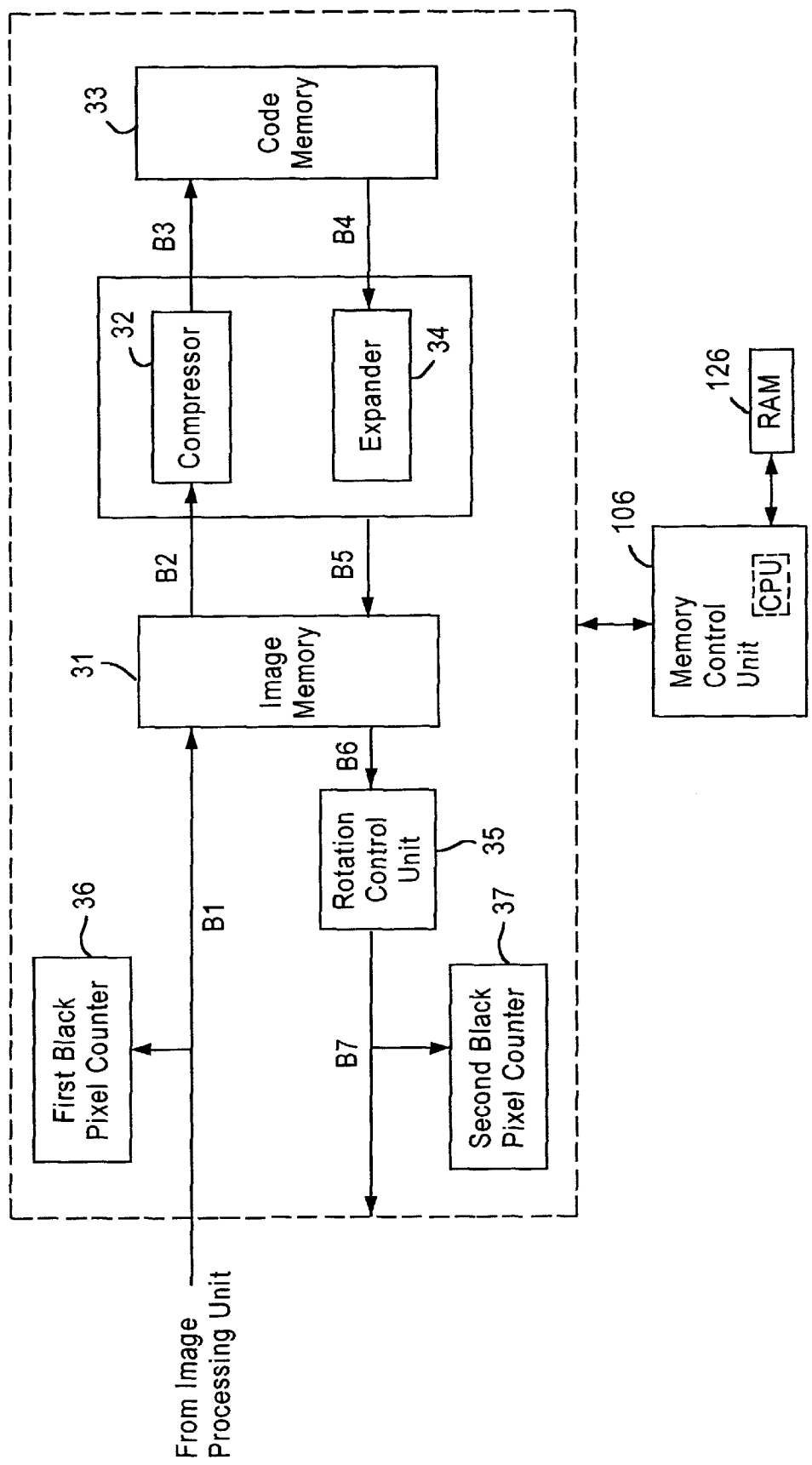
FIG. 4 shows the construction of the memory unit.

FIG. 4 shows the construction of memory unit 30. Print data transmitted through bus B1 from image signal processing unit 20 to memory unit 30 are temporarily stored in multi-port image memory 31. Image memory 31 stores two-pages of image data read at a resolution of 400 dpi (dots per inch). The print data stored in image memory 31 are sequentially subjected to compression encoding in compressor 32, and subsequently stored in code memory 33. Memory control unit 106 expands the code data stored in code memory 33 via expander 34 with a predetermined timing, and expands the data in image memory 31, and after the data are subjected to rotation processing in rotation control unit 35 as necessary, the expanded data are output via bus B7 to print processing unit 40.

FIG. 4 depicts rotation control unit 35 between bus B6 and bus B7, however, rotation control unit 35 may alternatively be provided in bus B2 or bus B5. Furthermore, compressor 32 and expander 34 are constructed so as to be capable of mutually independent operation to improve the copying speed. Also data transmission between the compressor 32 and expander 34 and code memory 33 is accomplished via direct memory access (DMA) transmission by means of DMA controllers not shown in the illustration.

In this copier, the various transmitted data are monitored, including print data transmitted from image signal processing unit 20 to bus B1, and print data transmitted from memory unit 30 to print processing unit 40 via bus B7. That is, a first black pixel counter 36 and second black pixel counter 37 are provided to count the feature quantity (i.e., number of black pixels in an image being copied). Therefore, an error in the operation of memory unit 30 can be verified by memory control unit 106 which compares count values of the first and second black pixel counters in a predetermined sequence. The content of the comparison process is discussed later.

Table 1 below shows an example of a first table generated by memory control unit 106 in RAM 126 based on the count result of the first black pixel counter 36.

TABLE I

| Output Page Number | Count Value |
|---|---|
| 1 | 26 |
| 2 | B9 |
| 3 | AD |
| 4 | 00 |
| 5 | 5F |
| 6 | FF |
| 7 | 45 |
| 8 | E3 |
| 9 | 14 |
| 10 | 00 |
| . | |
| . | |
| . | |
| 100 | 00 |

The first table shows the count value $K_{in}$ of black pixels in an image of page number $P_{in}$ input via image signal processing unit 20 in hexadecimal format. For example, according to the first table shown in Table 1, a count value $K_{in}$ of 26 represents the number of black pixels in the image of a first page (i.e., page number $P_{in}$=1) input from image signal processing unit 20 to memory unit 30 in conjunction with the start of a copy operation.

Table 2 below shows an example of a second table generated by memory control unit 106 in RAM 126 based on the count result by the second black pixel counter 37.

TABLE II

| Output Page Number | Count Value | Data Present |
|---|---|---|
| 1 | 8C | Absent |
| 2 | B9 | Present |
| 3 | 14 | Absent |
| 4 | 00 | Absent |
| 5 | 00 | Absent |
| 6 | 00 | Absent |
| 7 | 00 | Absent |
| 8 | 00 | Absent |
| 9 | 00 | Absent |
| 10 | 00 | Absent |
| . | | |
| . | | |
| . | | |
| 100 | 00 | Absent |

The second table shows the count value $K_{out}$ of black pixels in an image of page number $P_{out}$ output from memory unit 30 to print processing unit 40 in hexadecimal format, and shows the state of the data present flag which expresses the presence of data to be subjected to comparison. For example, according to the second tableshown in Table 2, the count value $K_{out}$ of 8C represents the number of black pixels in the image first output from memory unit 30 to print processing unit 40 (i.e., page number $P_{out}$=1) in conjunction with the start of a copy operation. In regard to the image of page number $P_{out}$=1, the data present flag initially is set at "present" but is changed to "absent" because no memory error is determined by the comparison process discussed below.

Figure 5:
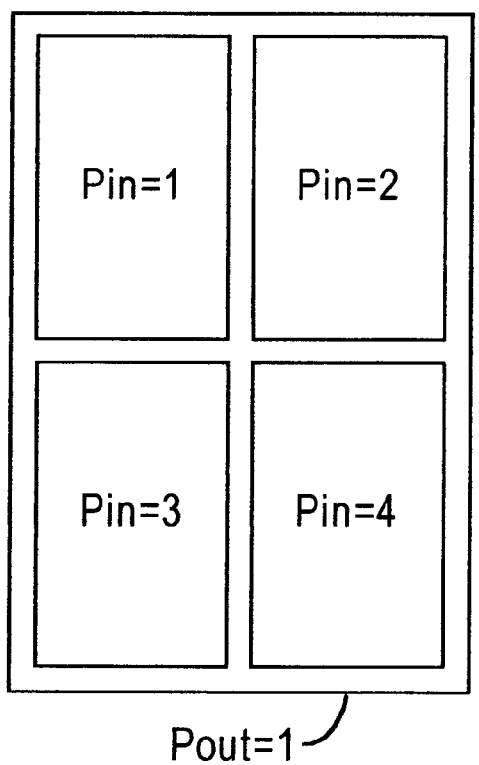
FIGS. 5(*a*) and 5(*b*) illustrate the content of a copy executed by the 4-in-1 mode.
Figure 5:
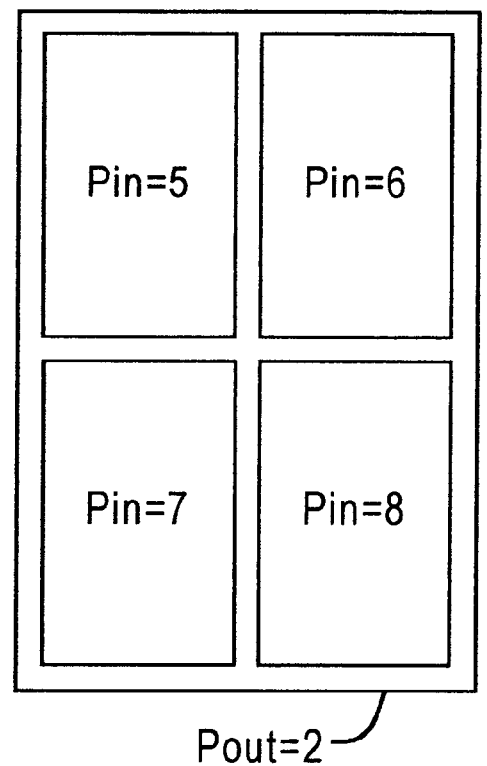

Table 3 below shows an example of a third table generated by memory control unit 106 in RAM 126 when the 4-in-1 mode is set to form images of four pages on a single copy sheet, as shown in FIGS. 5(*a*) and 5(*b*).

TABLE III

| Output Page Number | Input Page Number |
|---|---|
| 1 | 1, 2, 3, 4 |
| 2 | 5, 6, 7, 8 |
| 3 | |
| 4 | |
| 5 | |
| 6 | |
| 7 | |
| 8 | |
| 9 | |
| 10 | |
| . | |
| . | |
| . | |
| 100 | |

The third table shows the correspondence between the page number $P_{in}$ of the image input from image signal processing unit 20 and the page number $P_{out}$ of the image output from memory unit 30 to print processing unit 40. According to Table 3, the image data of a total of eight pages (input page number $P_{in}$=8) are read. The image data of page number $P_{out}$=1 output from memory unit 30 to print processing unit 40 correspond to image data of input page numbers $P_{in}$=1, 2, 3, and 4, and the image data of page number $P_{out}$=2 corresponds to the image data of input page numbers $P_{in}$=5, 6, 7, and 8. Memory control unit 106 collects the image data of the input page numbers $P_{in}$=1, 2, 3, and 4 as data of a single image, and outputs that data to print processing unit 40 as image data of output page number $P_{out}$=1 and collects the image data of input page numbers $P_{in}$=5, 6, 7, and 8 as data of a single image, and outputs that data to print processing unit 40 as image data of output page number $P_{out}$=2. At this time, memory control unit 106 determines the lower 8-bit value of the total of the up black pixel count values Kin of the input page numbers $P_{in}$=1, 2, 3, and 4 via the first table, and determines the black pixel count value $K_{out}$ of the images of output page number $P_{out}$=1 via the second table. Memory control unit 106 then determines the presence or absence of an error in memory unit 30 by comparing the black pixel count value $K_{out}$ with the total of the black pixel count values $K_{in}$. Print processing unit 40 generates LD drive signals based on the image data of the output page numbers $P_{out}$=1 and 2 output from memory unit 30, and semiconductor laser 62 emits a laser beam via the drive signals. Therefore, the output of FIGS. 5(*a*) and 5(*b*) are obtained.

Table 4 below shows an example of the third table generated by memory control unit 106 in RAM 126 when the normal copy mode is set to form an image of one page on a single copy sheet.

TABLE IV

| Output Page Number | Input Page Number |
|---|---|
| 1 | 1 |
| 2 | 2 |
| 3 | 3 |
| 4 | 4 |
| 5 | 5 |
| 6 | |
| 7 | |
| 8 | |
| 9 | |

TABLE IV-continued

| Output Page Number | Input Page Number |
|---|---|
| 10 | |
| . | |
| . | |
| . | |
| 100 | |

As shown in Table 4, the image data of page number $P_{Out}=1$ output from memory unit 30 to print processing unit 40 corresponds to the image data of input page number $P_{in}=1$. In this instance, memory control unit 106 compares the number of black pixels of each image of input page numbers $P_{in}=1, 2, \ldots$ to the number of black pixels of each image of output page numbers $P_{out}=1, 2, \ldots$, and determines whether or not there is an error in memory unit 30.

Table 5 below shows an example of the third table generated by memory control unit 106 in RAM 126 when the sequence of the images of two pages are rearranged on a single copy sheet.

TABLE V

| Output Page Number | Input Page Number |
|---|---|
| 1 | 1, 8 |
| 2 | 2, 7 |
| 3 | 3, 6 |
| 4 | 4, 5 |
| 5 | |
| 6 | |
| 7 | |
| 8 | |
| 9 | |
| 10 | |
| . | |
| . | |
| . | |
| 100 | |

As shown in Table 5, the image data of output page number $P_{out}=1$ output from memory unit 30 to print processing unit 40 corresponds to the image data of input page numbers $P_{in}=1, 8$. In this instance, memory control unit 106 compares the total number of black pixels of the images of input page numbers $P_{in}=1, 8$ to the number of black pixels of the image of output page number $P_{out}=1$, and determines whether or not there is an error in memory unit 30.

Figure 6:
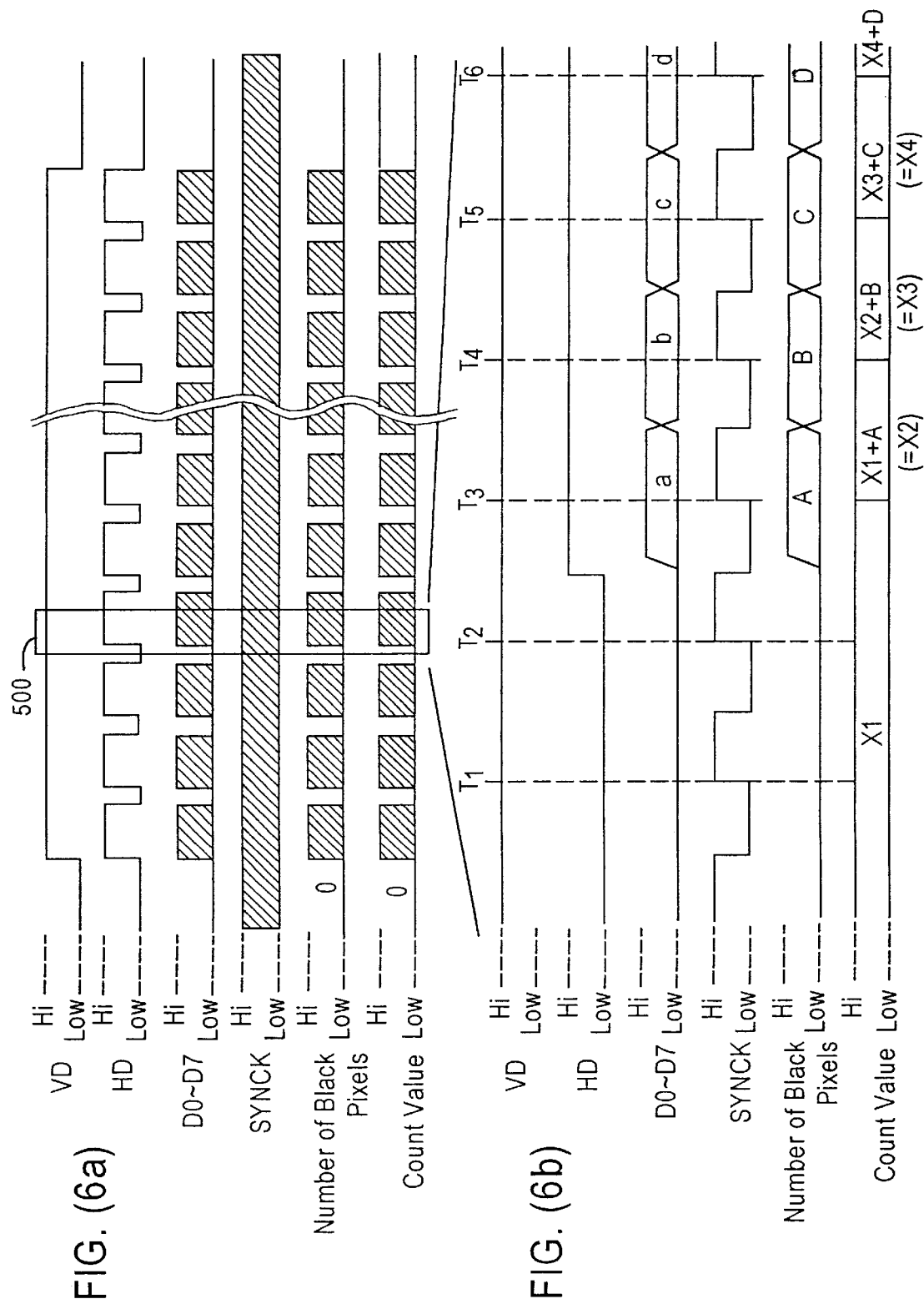
FIGS. 6(*a*) and 6(*b*) illustrate the method of counting black pixels and the transmission timing of data over bus Bi and bus B7.

FIG. 6 illustrates the method of counting black pixels and the transmission timing of data through bus B1 and bus B7. Bus B1 and bus B7 transmit data via the same signals and timing, and are controlled by signal VD expressing the image effective range of one page, signal HD expressing the effective range of each scan line within one page, signals D0–D7 expressing the 8-bit image data, and signal SYNC expressing the image data read timing. FIG. 6(a) shows the state of each signal when the image data of one page passes through bus B1 and bus B7. Since the detailed state of the black pixel count values, number of black pixels, signal SYNC, and signals D0–D7 within a single scan line cannot be shown, they are indicated by diagonal lines in FIG. 6(a), and the detailed state of the signals in range 500 circumscribed by a solid line in FIG. 6(a) is shown in FIG. 6(b).

In the timing chart of FIG. 6(b), signal VD and signal HD are high level signals, and the image data signals D0–D7 at time T1–T6 of the rise of signal SYNC are managed as valid data. Black pixel numbers A, B, C, and D are numbers in the high level range among the 8-bit signals D0–D7 expressed by a, b, c, d which are managed as valid. The first black pixel counter 36 and the second black pixel counter 37 are switched from low level to high level by signal VD, and count the number of black pixels of one page of image data by adding the total number of black pixels. until again set at low level. For example, at times T1 and T2 the black pixel count value remains unchanged at X1 because the image data are not valid since the signal HD is low level. At times T3, T4, T5, and T6, however, the black pixel count is added sequentially to the total X1 of,the previous line because signals VD and HD are both high level signals and the data are valid. For example, X1+A=X2 at time T3, X2+B=X3 at time T4, and X3+C=X4 at time T5.

Figure 7:
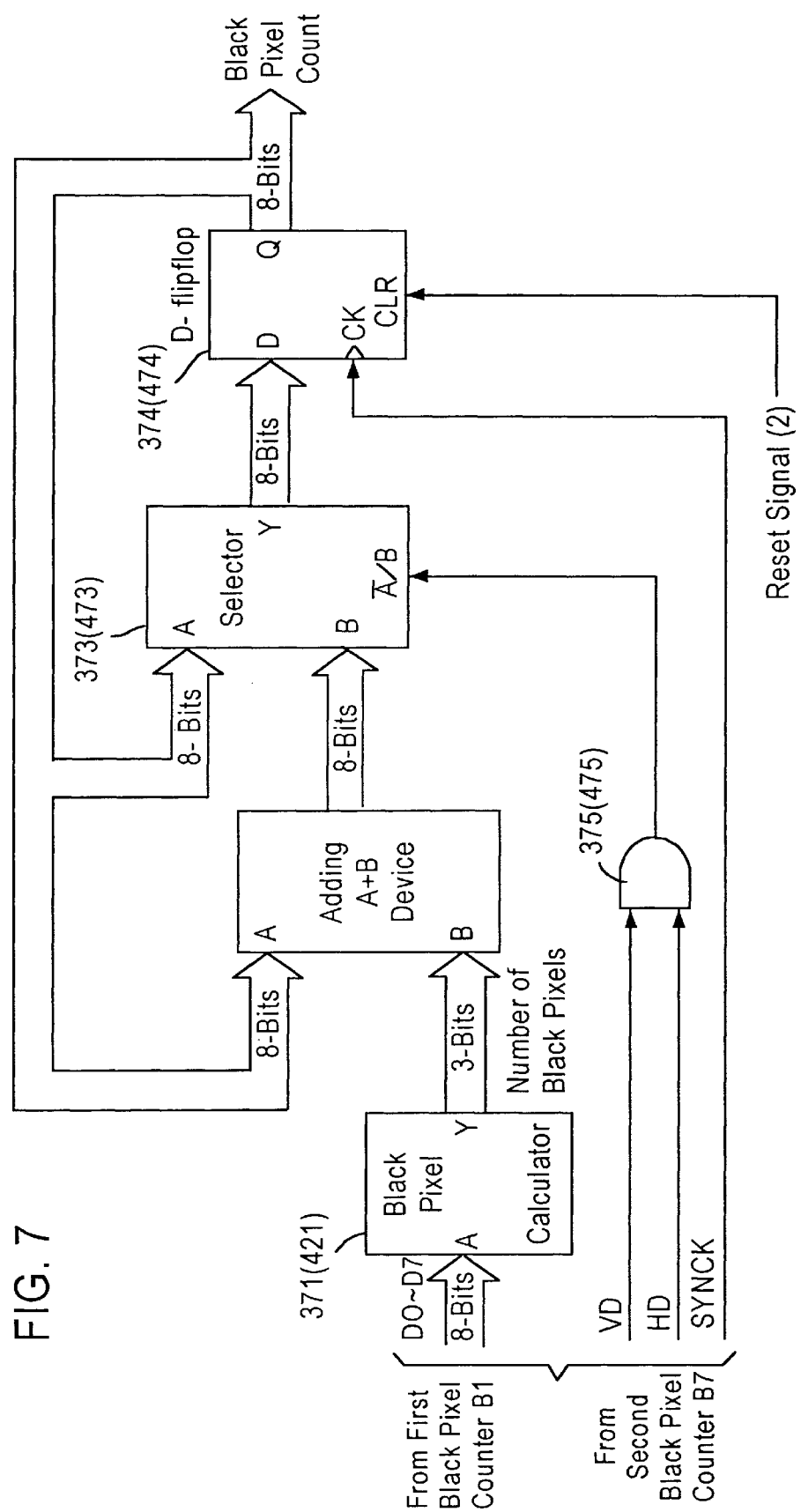
FIG. 7 shows the construction of the first black pixel counter.

FIG. 7 illustrates the first black pixel counter 36. The second black pixel counter 37 is identical to the first black pixel counter 36, and thus FIG. 7 also illustrates the second Hi black pixel counter 37. The 8-bit image data received from bus B1(bus B7 in the case of the second black pixel counter 37) are input to black pixel calculator 371. The number of black pixels is counted in black pixel calculator 371, which outputs a 3-bit signal expressing the number of black pixels. The output number of black pixels is received at input B of adding device 372, and is added to the black pixel count numbers input to input A, and output A+B is output. The output A+B from adding device 372 is received at input B of selector 373, and is output from selector 373 as output Y when the signal input to selector signal input pin A/B is a high level signal. Output Y from the selector 373 is set in D-flipflop circuit 374 synchronously with the timing of the rise of signal SYNC. Signals VD and HD are input to AND gate 375, and the current total black pixel count number, i.e., the output Y from selector 373 and D flipflop circuit 374, is output when either signal is a low level signal. Therefore, the value set in the D-flipflop circuit does not change.

Figure 8:
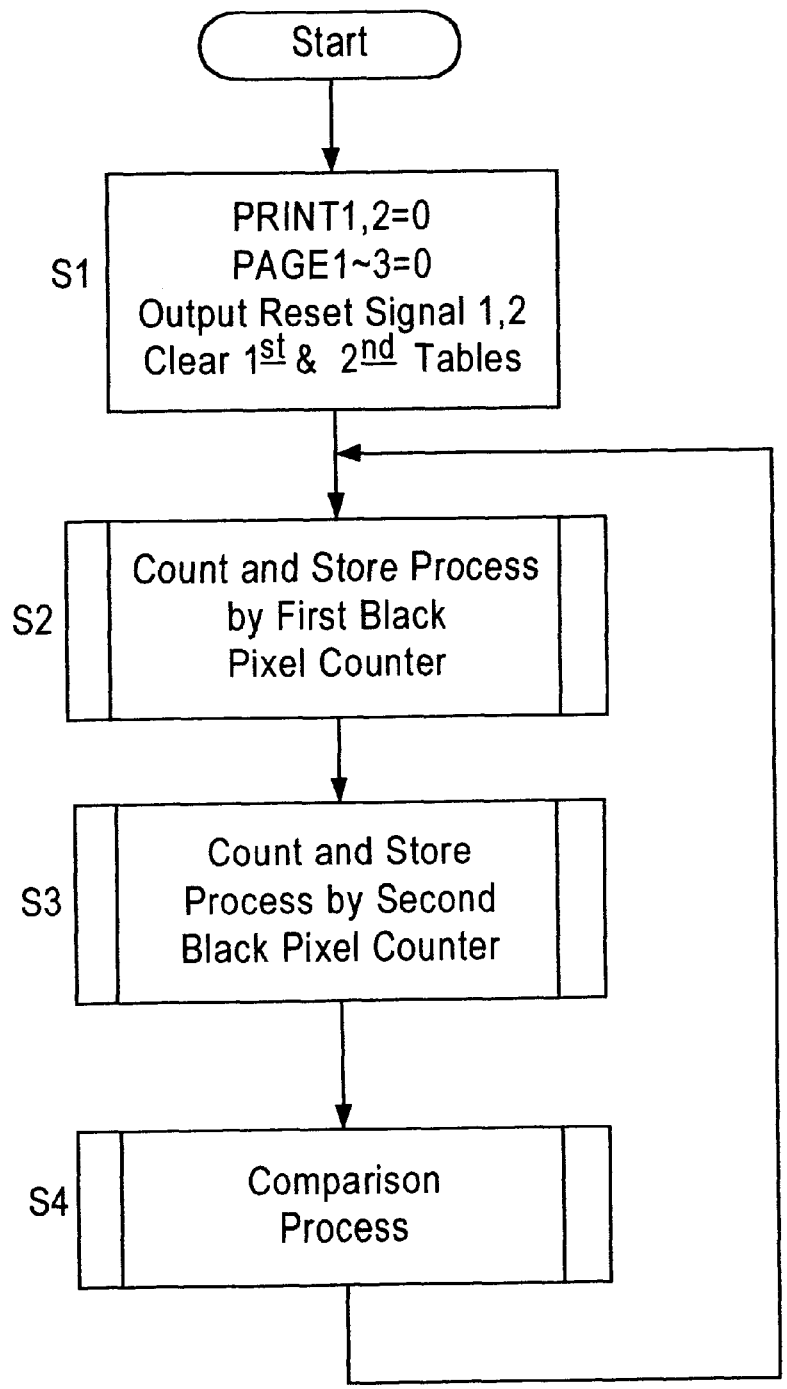
FIG. 8 is a flow chart of the main routine of the memory error detection process.

FIG. 8 is a flow chart of the main routine of the memory error detection process executed by memory control unit 106. First, initialization is executed (step S1). At initialization, the values of flags PRINT1–2 and PAGE1–3 used in each subroutine are reset to 0, and reset signals 1 and 2 are output to initialize the first black pixel counter 36 and the second black pixel counter 37, and the first and second tables used to store count values and for memory error determination are cleared. After initialization, the count and store processes are executed by the first black pixel counter 36 (step S2), the count and store processes are executed by the second black pixel counter 37 (step S3), and the comparison process (step S4) is executed based on the count results obtained by steps S2 and S3.

Figure 9:
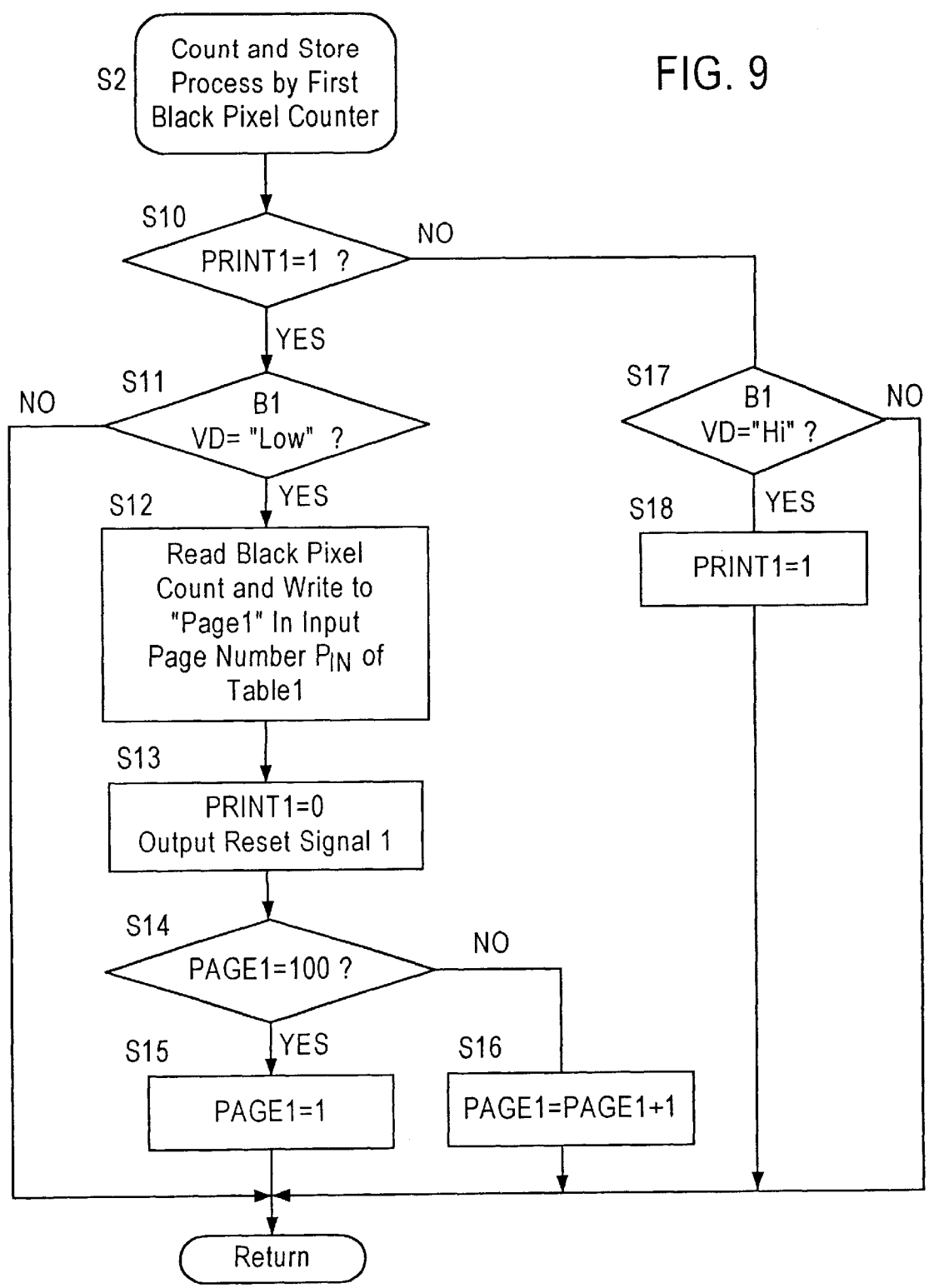
FIG. 9 is a flow chart of the black pixel count and storage process in the first black pixel counter.

FIG. 9 is a flow chart of the black pixel counting and storage processes (step S2 of FIG. 8) executed by the first black pixel counter 36. In steps S10, S11, and S17, a determination is made as to whether or not a 1-page black pixel count has ended. When the flag PRINT1 is 0 (step S10: NO) and the signal VD passing through bus B1 is a low level signal (step S17: NO), the copy start state is not enabled, and the routine directly returns. When the flag PRINT1 is 0 (step S10: NO) and the signal VD passing through bus B1 is a high level signal (step S17: YES), the signal VD expressing valid data is input from image signal processing unit 20 to enable the start of data reception, and after flag PRINT1 is set to 1 expressing on-going data reception (step S18), the routine returns. When the flag PRINT1 has been previously set to 1 (step S10: YES) and the signal VD passing through bus B1 is a high level signal (step S11: NO), the routine directly returns because the number of black pixel count is on-going while the data reception continues. When the flag PRINT1 has been previously set to 1 (step S10: YES) and the signal VD passing through the bus B1 is a low level signal (step S11: YES), the black pixel count ends, and the count value $K_{in}$ is fetched from the first black pixel counter 36. Further, because the 1-page count value read out state is enabled, the count value $K_{in}$ read from the position of input page $P_{in}$=PAGE1 is written to the first table (refer to Table 1) generated in RAM 126 (step S12), the flag PRINT1 value is reset to 0, and a reset signal 1 is output to clear the first black pixel counter 36 (step S13). The first table is capable of storing data for 10 pages in code memory 33, and a determination is made as to whether or not the input page number Pi, value PAGE1 has attained 100 (step S14). If the PAGE1 value has reached 100 (step S14: YES), the PAGE1 value is returned to 1 (step S15). When the PAGE1 value has not yet reached 100 (step S14: NO), the PAGE1 value is incremented by 1 (step S16), and thereafter the routine returns.

Figure 10:
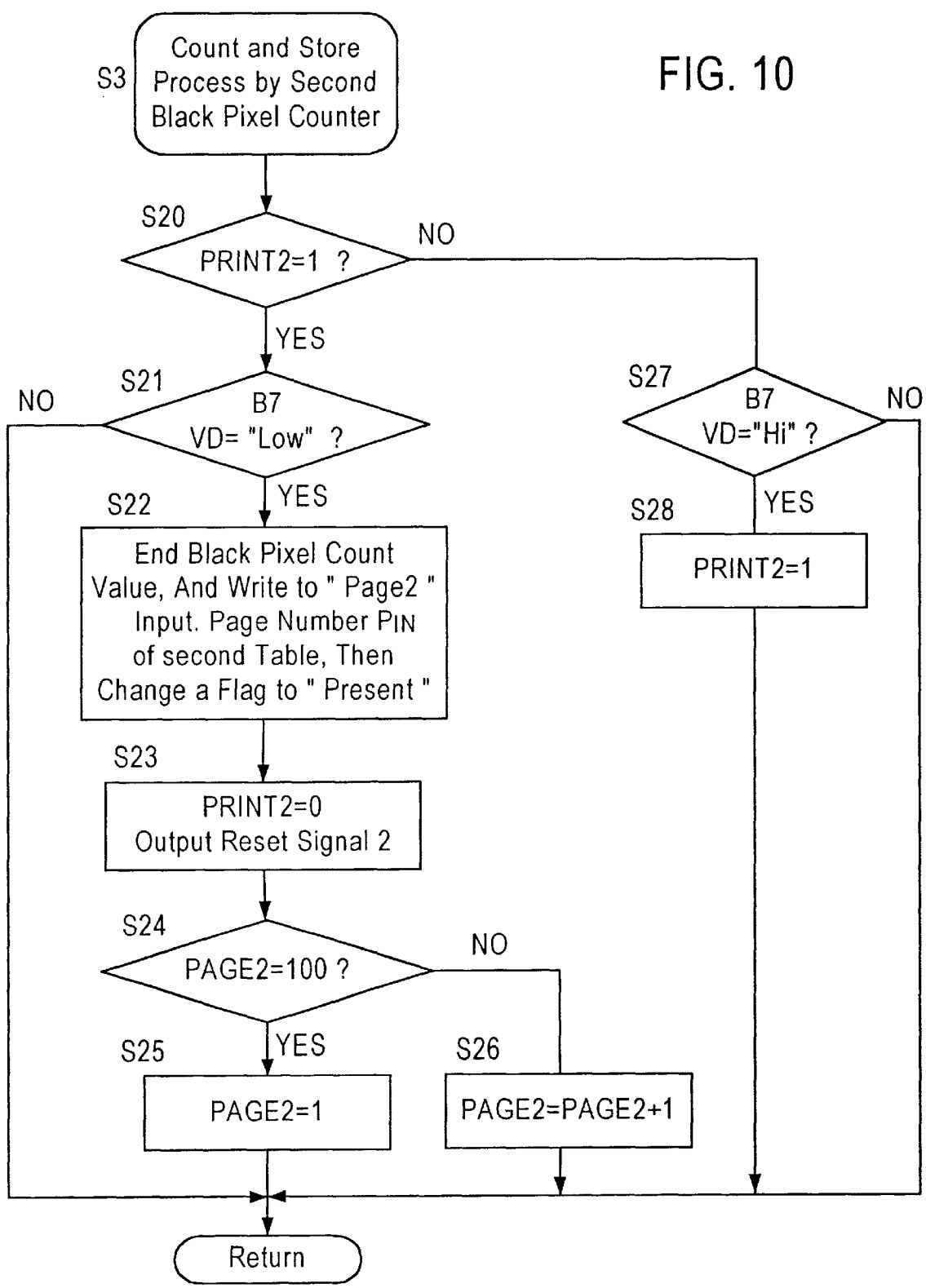
FIG. 10 is a flow chart of the black pixel count and storage process by the second black pixel counter.

FIG. 10 is a flow chart of the black pixel count and storage processes (refer to step S3 of FIG. 8) executed by the second black pixel counter 37. In steps S20, S21, and S27, a check is made to determine whether or not the one-page black pixel count has ended. When the flag PRINT2 is 0 (step S20: NO) and the signal VD passing through the bus B7 is a low level signal(step S27: NO), the copy start operation is not enabled, and the routine directly returns. When the flag PRINT2 is set to 0 (step S20: NO) and the signal VD passing through the bus B7 is a high level signal (step S27: YES), the signal VD expressing valid image data from image signal processing unit 20 is input to start data reception, the flag PRINT2 is set to 1 (step S28), whereupon the routine returns. When the flag PRINT2 has been previously set to 1 (step S20: YES) and the signal VD passing through the bus B7 is a high level signal (step S21: NO), the routine directly returns due to the on-going black pixel count while data reception continues. When the flag PRINT2 has been previously set to 1 (step S20: YES) and the signal VD passing through the bus B7 is a low level signal (step S21: YES), the black pixel count ends. Further, since the one-page count value readout enabled state is set, the count value $K_{out}$ of the second black pixel counter 37 is read, the count value $K_{out}$ read at the position of output page number $P_{out}$=PAGE2 from the second table (refer to FIG. 2) generated in RAM 126 is written together with a flag expressing the data "present" for comparison (step S22), the flag PRINT2 is reset to 0, and the reset signal 2 is output to clear the second black pixel counter 37 (step S23). Data storage in the second table is enabled to the 100th page of the 100-page capacity code memory 33, and a check is made to determine whether or not the PAGE2 value has reached 100 (step S24). If the PAGE2 value has reached 100 (step S24: YES), the PAGE2 value is reset to 1 (step S25). If the PAGE2 value has not yet reached 100 (step S24: NO), the PAGE2 value is incremented by 1 (step S26), and the routine returns.

Figure 11:
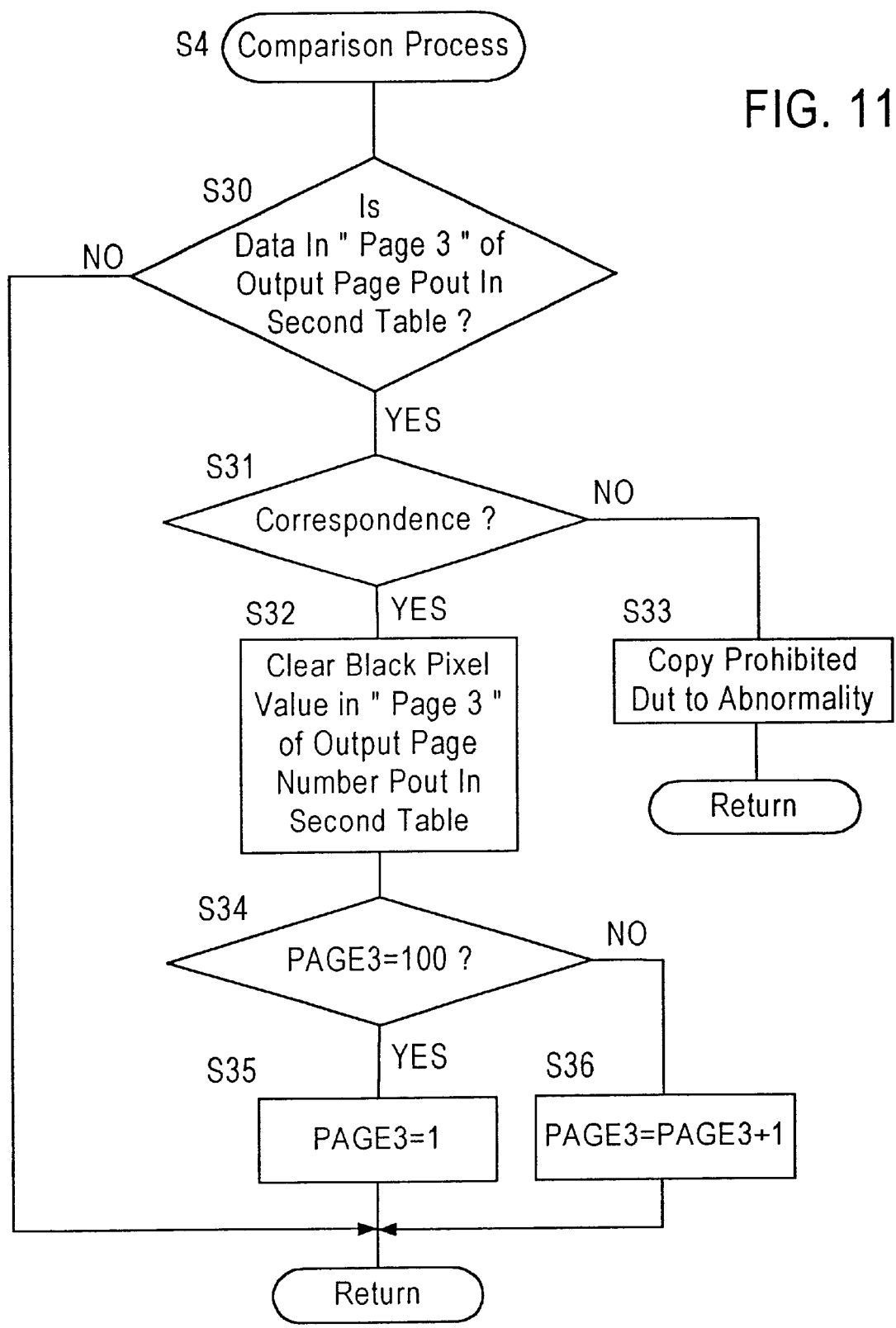
FIG. 11 is a flow chart of the comparison process.

FIG. 11 is a flow chart of the comparison process (step S4, FIG. 8). The data present/absent flag is checked at the position of output page number $P_{out}$=PAGE3 in the second table stored in RAM 126 (step S30). If the $P_{out}$=PAGE3 data present/absent flag is set to "absent" (step S30: NO), the routine directly returns. If the $P_{out}$=PAGE3 data present/absent flag is set to "present" (step S30: YES), the black pixel count value of output page $P_{out}$ stored in the second table is compared to the black pixel count value (i.e., the lower 8-bit value of the total count value in the case of a plurality of values) of the input page number $P_{in}$ stored in the first table (step S31). The black pixel count value of output page $P_{out}$ corresponds to the third table (refer to Table 3) stored in RAM 126. As a result of the comparison, when the black pixel count values match (step S31: YES), it is determined that the memory unit is normal. In this case, the data present/absent flag for the output page number $P_{out}$=PAGE3 of the second table is updated to "absent" (step S32). On the other hand, when the result of the comparison is that the black pixel count values do not match (step S31: NO), an error in the memory unit 30 is identified and the copy operation is prohibited (step S33), and thereafter the routine returns. A check is made to determine, whether or not the 100th page of the 100-page capacity code memory 33 has been reached (step S34). If the PAGE3 value has reached 100 (step S34: YES), the PAGE3 value is returned to 1 (step S35). If the PAGE3 value has not yet reached 100 (step S34: NO), the PAGE3 value is incremented by 1 (step S26), and the routine returns.

If a memory error condition is determined, a message is displayed on liquid crystal touch panel 301.

The content of the comparison process executed in the aforesaid step S31 is described below by way of example using the third table shown in Table 3. First, referring to the output page number $P_{out}$=1, the corresponding input page number $P_{in}$ is understood to be 1, 2, 3, and 4. Referring to the second table shown in Table 2, the black pixel count value $K_{out}$ of the output page number $P_{out}$=1 is 8C. Referring to the first table shown in Table 1, the black pixel count values $K_{in}$ of the input page value of the total of the values is 8C. Therefore, the result of comparison shows that the black pixel count values match, and the operation of memory unit 30 is deemed normal relative to the readout of image data of the output page number $P_{out}$=1.

Referring now to the third table shown in Table 3, the input page numbers $P_{in}$ corresponding to the output page number $P_{out}$=2 are understood to be 5, 6, 7, 8. Referring to the second table shown in Table 2, the black pixel count value $K_{out}$ of the output page number $P_{out}$=2 is B9. Referring to the first table shown in Table 1, the black pixel count values $K_{in}$ of input page numbers $P_{in}$=5, 6, 7, 8 are 5F, FF, 45, and E3, and the lower 8-bit value of the total values is not B9. When the black pixel count values do not match, an error in the memory unit 30 is identified relative to the readout of image data of output page number $P_{out}$=1.

As described above, the third table is changed by the copy mode; the black pixel count value comparison is executed by memory control unit 106 in accordance with the third table whatever the mode, including the 1-to-1 mode shown in Table 4, or when the page sequence has been changed as shown in Table 5. According to the aforesaid construction, it is possible to verify whether or not memory unit 30 is operating normally, and whether or not a memory error occurs in the data readout even when the image data input to memory unit 30 differs from the image data output therefrom.

The image forming apparatus of the present invention is capable of verifying errors in the operation of a memory unit via a memory error verification means even when the image data input to the memory unit differs from the image data output therefrom.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A memory error detecting device for an image forming apparatus, comprising:
   a first generating means that generates first information derived from input image data;
   a second generating means that generates second information derived from output image data;
   a comparison means that compares the first information with the second information, and generates a comparison result signal; and
   a memory error warning means that generates a memory error signal when the comparison result signal indicates that the first information differs from the second information, wherein
      the first information comprises a black pixel count for the inut image data, and
      the second information comprises a black pixel count for the output image data.

2. A memory error detecting device for an image forming apparatus, comprising:
   a first generating means that generates first information derived from input image data;
   a second generating means that generates second information derived from output image data;
   a comparison means that compares the first information with the second information, and generates a comparison result signal;
   a memory error warning means that generates a memory error signal when the comparison result signal indicates that the first information differs from the second information;
   a correction means that, prior to the comparison by the comparison means, modifies the first information in accordance with edited input image data, wherein
   the comparison means compares the modified first information with the second information, and generates a comparison result signal,
   the memory error warning means generates a memory error, and
   the modified first information comprises a black pixel count for the edited input image data, and the second information comprises a black pixel count for the output image data.

3. A memory unit for use in an image forming apparatus, said memory unit comprising:
   a memory error detecting device that includes
      a first generating means that generates first information derived from input image data,
      a second generating means that generates second information derived from output image data,
      a comparison means that compares the first information with the second information, and generates a comparison result signal, and
      a memory error warning means that generates a memory error signal when the comparison result signal indicates that the first information differs from the second information, wherein
   the first information comprises a black pixel count for the input image data, and the second information comprises a black pixel count for the output image data.

4. A memory unit for use in an image forming apparatus, said memory unit comprising:
   a memory error detecting device that includes
      a first generating means that generates first information derived from input image data,
      a second generating means that generates second information derived from output image data,
      a comparison means that compares the first information with the second information, and generates a comparison result signal; and
   a memory error warning means that generates a memory error signal when the comparison result signal indicates that the first information differs from the second information;
   a correction means that, prior to the comparison by the comparison means, modifies the first information in accordance with edited input image data, wherein
   the comparison means compares the modified first information with the second information, and generates a comparison result signal,
   the memory error warning means generates a memory error signal when the comparison result signal indicates that the modified first information differs from the second information, and
   the modified first information comprises a black pixel count for the edited input image data, and the second information comprises a black pixel count for the output image data.

5. A memory unit for use in an image forming apparatus, said memory unit comprising:
   a memory error detecting device that includes
      a first generating means that generates first information derived from input image data,
      a second generating means that generates second information derived from output image data,
      a comparison means that compares the first information with the second information, and generates a comparison result signal; and
      a memory error warning means that generates a memory error signal when the comparison result signal indicates that the first information differs from the second information;
   a correction means that, prior to the comparison by the comparison means, modifies the first information in accordance with edited input image data;
   are image memory for storing the input image data and the output image data;
   a compressor for performing compression encoding with the input image data and generating input image code data;
   a code memory for storing the input image code data;
   an expander for expanding the input image code data; and
   a rotation control unit for performing a rotation function on the output image data, wherein
      the comparison means compares the modified first information with the second information, and generates the comparison result signal,
      the memory error warning means generates a memory error signal when the comparison result signal indicates that the modified first information differs from the second information,
      the modified first information comprises a black pixel count for the input image data, and
      the second information comprises a black pixel count for the output image data.

6. An image forming apparatus, comprising:

a memory unit capable of storing input image data and output image data;

an image forming means for forming an image on a medium based on the output image data which is output from the memory unit;

a first information generating means for generating first information indicating content of the input image data;

a first storage means for storing the first information in an input sequence by which the input image data was stored in the memory unit;

a second information generating means for generating second information indicating content of the output image data;

a second storage means for storing the second information in an output sequence by which the second image data was output from the memory unit;

a third storage means for storing third information indicating a relationship between the input image data and the output image data;

a comparison means that compares the first information with the second information based on the third information, and generates a comparison result signal; and a memory error warning means that generates a memory error signal, signifying an error in the memory unit, when the comparison result signal indicates that a memory error has occurred.

* * * * *